(12) United States Patent
Benson

(10) Patent No.: US 9,058,707 B2
(45) Date of Patent: Jun. 16, 2015

(54) SYSTEM AND METHOD FOR MANAGING AND MAINTAINING ABRASIVE BLASTING MACHINES

(76) Inventor: Ronald C. Benson, Minneapolis, MN (US)

( * ) Notice: Subject to any disclaimer, the term of this patent is extended or adjusted under 35 U.S.C. 154(b) by 709 days.

(21) Appl. No.: 12/707,616

(22) Filed: Feb. 17, 2010

(65) Prior Publication Data

US 2010/0211429 A1 Aug. 19, 2010

Related U.S. Application Data

(60) Provisional application No. 61/153,193, filed on Feb. 17, 2009.

(51) Int. Cl.
| | | |
|---|---|---|
| *G06F 19/00* | (2011.01) | |
| *B24B 49/00* | (2012.01) | |
| *B24C 3/06* | (2006.01) | |
| *G01N 27/00* | (2006.01) | |
| *G07C 1/10* | (2006.01) | |
| *B24C 9/00* | (2006.01) | |
| *G06Q 10/00* | (2012.01) | |
| *G06Q 50/08* | (2012.01) | |

(52) U.S. Cl.
CPC ... *G07C 1/10* (2013.01); *B24C 9/00* (2013.01); *G06Q 10/20* (2013.01); *G06Q 50/08* (2013.01)

(58) Field of Classification Search
USPC ............... 451/1, 5, 28, 92; 700/174; 324/71.4
See application file for complete search history.

(56) References Cited

U.S. PATENT DOCUMENTS

| | | | | |
|---|---|---|---|---|
| 3,589,599 A | * | 6/1971 | Brandt | 235/98 C |
| 3,592,362 A | * | 7/1971 | Kane | 222/148 |
| 3,848,927 A | * | 11/1974 | Livingston | 299/13 |
| 3,904,117 A | * | 9/1975 | Adams, Jr. | 239/146 |
| 3,927,551 A | * | 12/1975 | Alburger | 73/1.04 |
| 3,969,618 A | * | 7/1976 | Strubel et al. | 714/719 |
| 3,981,104 A | * | 9/1976 | Dreher | 451/88 |
| 4,076,566 A | * | 2/1978 | Power | 156/153 |
| 4,092,942 A | * | 6/1978 | Kurohiji et al. | 114/222 |
| 4,099,481 A | * | 7/1978 | Lyons | 118/702 |
| 4,121,388 A | * | 10/1978 | Wilson | 451/87 |
| 4,130,480 A | * | 12/1978 | Loewenthal | 209/551 |
| 4,375,740 A | * | 3/1983 | Brown | 451/88 |
| 4,433,698 A | * | 2/1984 | Blaul | 134/56 R |
| 4,624,080 A | * | 11/1986 | Jakobsson | 451/87 |
| 4,627,197 A | * | 12/1986 | Klee et al. | 451/3 |
| 4,655,847 A | * | 4/1987 | Ichinoseki et al. | 134/7 |
| 4,753,549 A | * | 6/1988 | Shook et al. | 404/75 |
| 4,877,638 A | * | 10/1989 | Novak et al. | 427/8 |
| 4,901,928 A | * | 2/1990 | Abbott et al. | 239/530 |
| 4,977,910 A | * | 12/1990 | Miyahara et al. | 134/7 |
| 5,024,029 A | * | 6/1991 | Abbott et al. | 451/101 |
| 5,056,275 A | * | 10/1991 | Wada et al. | 451/87 |
| 5,117,366 A | * | 5/1992 | Stong | 700/160 |
| 5,123,206 A | * | 6/1992 | Woodson | 451/39 |
| 5,136,815 A | * | 8/1992 | Kramarenko et al. | 451/165 |

(Continued)

*Primary Examiner* — Robert Fennema
*Assistant Examiner* — Thomas Stevens
(74) *Attorney, Agent, or Firm* — Dentons US LLP

(57) ABSTRACT

A system and method for managing abrasive blasting may include timing duration of blast media being blown in performing abrasive blasting using an abrasive blasting machine. Time duration that an operator worked in association with the duration of the blast media being blown may be received. A blasting efficiency ratio may be computed based on the duration of the blasting media being blown and duration of that the operator worked. The blasting efficiency ratio may be displayed to a user.

5 Claims, 14 Drawing Sheets

(56) References Cited

U.S. PATENT DOCUMENTS

| | | | | |
|---|---|---|---|---|
| 5,139,581 A * | 8/1992 | Grimm et al. | | 148/632 |
| 5,143,102 A * | 9/1992 | Blaul | | 134/58 R |
| 5,185,968 A * | 2/1993 | Lyras | | 451/38 |
| 5,239,788 A * | 8/1993 | Woodson | | 451/39 |
| 5,257,530 A * | 11/1993 | Beattie et al. | | 73/61.75 |
| 5,355,823 A * | 10/1994 | Goldbach et al. | | 114/222 |
| 5,398,632 A * | 3/1995 | Goldbach et al. | | 114/222 |
| 5,493,722 A * | 2/1996 | Gunn et al. | | 455/517 |
| 5,556,325 A * | 9/1996 | Shank, Jr. | | 451/101 |
| 5,584,939 A * | 12/1996 | Dahlin et al. | | 134/7 |
| 5,622,265 A * | 4/1997 | Drenter et al. | | 209/221 |
| 5,695,385 A * | 12/1997 | Bachand et al. | | 451/38 |
| 5,731,998 A * | 3/1998 | Lotito et al. | | 702/189 |
| 5,768,280 A * | 6/1998 | Way | | 370/486 |
| 5,775,979 A * | 7/1998 | Coke et al. | | 451/87 |
| 5,827,114 A * | 10/1998 | Yam et al. | | 451/75 |
| 5,840,102 A * | 11/1998 | McCracken | | 95/268 |
| 5,870,667 A * | 2/1999 | Globuschutz | | 455/419 |
| 5,907,490 A * | 5/1999 | Oliver | | 700/90 |
| 6,032,804 A * | 3/2000 | Paulson | | 209/148 |
| 6,128,547 A * | 10/2000 | Tomoeda et al. | | 700/170 |
| 6,482,078 B1 * | 11/2002 | Pittman | | 451/87 |
| 6,487,597 B1 * | 11/2002 | Horie et al. | | 709/227 |
| 6,507,163 B1 * | 1/2003 | Allen | | 318/560 |
| 6,937,712 B2 * | 8/2005 | Lemchen et al. | | 379/159 |
| 6,950,718 B2 * | 9/2005 | Smarsh et al. | | 700/164 |
| 7,040,961 B2 * | 5/2006 | Boumerzoug et al. | | 451/39 |
| 7,090,560 B2 * | 8/2006 | Billig | | 451/5 |
| 7,113,839 B2 * | 9/2006 | Ferguson et al. | | 700/115 |
| 7,207,871 B1 * | 4/2007 | Zuniga et al. | | 451/288 |
| 7,293,570 B2 * | 11/2007 | Jackson | | 134/94.1 |
| 7,413,986 B2 * | 8/2008 | Paik | | 438/690 |
| 7,476,273 B2 * | 1/2009 | Williams | | 106/713 |
| 7,616,224 B2 * | 11/2009 | Kaneko | | 347/224 |
| 7,690,307 B2 * | 4/2010 | Gonzalez | | 102/333 |
| 7,799,413 B2 * | 9/2010 | Andersson et al. | | 428/216 |
| 7,817,162 B2 * | 10/2010 | Bolick et al. | | 345/592 |
| 7,887,393 B2 * | 2/2011 | Mase et al. | | 451/11 |
| 7,915,766 B2 * | 3/2011 | Hernandez et al. | | 307/137 |
| 8,057,279 B2 * | 11/2011 | Connelly | | 451/2 |
| 8,069,789 B2 * | 12/2011 | Hummel et al. | | 102/202.12 |
| 2002/0118808 A1 * | 8/2002 | Kelleher et al. | | 379/202.01 |
| 2003/0075622 A1 * | 4/2003 | Morita | | 239/585.1 |
| 2003/0114948 A1 * | 6/2003 | Hellemann et al. | | 700/100 |
| 2003/0195646 A1 * | 10/2003 | Yang et al. | | 700/96 |
| 2003/0224704 A1 * | 12/2003 | Shank | | 451/38 |
| 2004/0053561 A1 * | 3/2004 | Pieper | | 451/38 |
| 2004/0092216 A1 * | 5/2004 | Publ et al. | | 451/87 |
| 2004/0268341 A1 * | 12/2004 | Kenworthy | | 717/174 |
| 2005/0010459 A1 * | 1/2005 | Kawabata et al. | | 705/7 |
| 2005/0119780 A1 * | 6/2005 | Smarsh et al. | | 700/164 |
| 2005/0217525 A1 * | 10/2005 | McClure et al. | | 102/311 |
| 2005/0266779 A1 * | 12/2005 | Skinner | | 451/91 |
| 2007/0037484 A1 * | 2/2007 | Ohishi et al. | | 451/5 |
| 2007/0043529 A1 * | 2/2007 | Johnson | | 702/150 |
| 2007/0164104 A1 * | 7/2007 | Dulgerian et al. | | 235/382 |
| 2007/0171442 A1 * | 7/2007 | Granger | | 358/1.9 |
| 2007/0283521 A1 * | 12/2007 | Foster et al. | | 15/314 |
| 2008/0202991 A1 * | 8/2008 | Meagher | | 210/85 |
| 2008/0235069 A1 * | 9/2008 | Chiappetta et al. | | 705/7 |
| 2008/0287039 A1 * | 11/2008 | Connelly | | 451/38 |
| 2009/0240366 A1 * | 9/2009 | Kaushal et al. | | 700/110 |
| 2010/0196129 A1 * | 8/2010 | Buckner | | 414/467 |
| 2012/0071129 A1 * | 3/2012 | Haney | | 455/404.2 |

* cited by examiner

MANAGE ABRASIVE BLASTING
PREVENTATIVE MAINTENANCE

Address: http://www.manageabrasiveblastingmachines/ABC_Construction/maint

1302

| MACHINE | BLOWER | CLUTCH | NOZZLES | | | | | | | | BLOWER VALVE |
|---|---|---|---|---|---|---|---|---|---|---|---|
| | | | 1 | 2 | 3 | 4 | 5 | 6 | 7 | 8 | |
| 1 | 72/1000 | 247/750 | 95% | 72% | 10% | 45% | 83% | 6% | 15% | 21% | 75/370 |
| 2 | 748/1000 | 735/750 | 42% | 15% | 19% | 12% | 74% | 86% | 17% | 83% | 347/370 |
| ... | ... | ... | ... | ... | ... | ... | ... | ... | ... | ... | ... |
| N | 53/1000 | 37/750 | 1% | 93% | 6% | 73% | 18% | 15% | 34% | 98% | 75/370 |

MAINTENANCE LOG

1304

| MACHINE | HISTORY | PART | ACTION | TECH | NOTES |
|---|---|---|---|---|---|
| 1 | 2/14/10 | BLOWER | PM REPLACEMENT | BOB SMITH | — |
| 1 | 2/14/10 | NOZZLE 6 | PM REPLACEMENT | BOB SMITH | — |
| 1 | 2/14/10 | CLUTCH | TIGHTENED | BOB SMITH | TIGHTENED DUE TO SLIPPAGE |
| 8 | 2/12/10 | PRECLASSIFIER | CLEANED | BOB SMITH | PRECLASSIFIER CLOGGED |
| 8 | 2/12/10 | DRIVE SHAFT | OILED | BOB SMITH | ROUTINE OILING |
| 3 | 2/1/10 | NOZZLE 4 | REPLACED | TOM JONES | BROKEN SWITCH |
| 3 | 2/1/10 | VACUUM | REPLACED SEAL | TOM JONES | SEAL BROKEN |

SYSTEM AND METHOD FOR MANAGING AND MAINTAINING ABRASIVE BLASTING MACHINES

RELATED APPLICATIONS

This U.S. patent application is related to co-pending U.S. Patent Application Ser. No. 61/153,193 filed on Feb. 17, 2009, the entire contents of which are herein incorporated by reference in their entirety.

BACKGROUND

Large structures, such as bridges, tunnels, tanks, ships, and so forth, are generally formed of concrete and steel. While these materials are strong and relatively inexpensive, corrosion and weathering results in a need to maintain, repair, or replace the structures. Replacement of structures is expensive and oftentimes inconvenient to the public. One technique for maintaining or repairing structures includes the use of abrasive blasting to clean or strip surfaces of the structure.

Abrasive blasting uses a variety of blast media, including sand, coal slag, garnet, steel grit, and other blast media, and is the most common method of removing corrosion and coatings from steel and concrete surfaces. In its simplest form, blast media under pressure is mixed with air in a metering valve directly under a blast pot or pressure vessel on an abrasive blasting machine. By controlling the amount of blast media that enters an airflow that leads out of a blast hose to a nozzle, an optimum balance of air and blast media can be achieved, thereby allowing for the highest productivity in preparing a surface, whether performed by automated equipment or human operators.

Industrial abrasive blasting processes, invented in the early 1900s, for use in preparing surfaces for protective coatings have always been relatively expensive based on a need for large volumes of high pressure compressed air at up to 200 psi. Equipment used to generate such pressures include the use of a stationary or mobile compressor (e.g., electric or diesel). Supporting the abrasive blasting process includes the use of blasting media, such as sand, steel grit, or other blast media to mix with the air, and labor to manage and operate nozzles used to control the blast media being directed onto the structures.

Abrasive blasting work to prepare surfaces for coating can be accomplished in a fixed facility, such as a blast room, where structural components to be treated are brought for the abrasive blasting process to be completed. Such fixed location processes are common where abrasive blasting is part of a manufacturing process that takes place before or after welding, but always before application of protective coatings. In mobile operations, where blasting equipment is moved to a structure needing abrasive blasting, such as is the case with preparation prior to coating of bridges, tanks, and ships, everything, including the blasting equipment and blast media, must be moved to the structure where the work is to take place. In the case of bridge work, this means being located out on a highway, where traffic is generally diverted during the abrasive blasting process. For storage tanks, the abrasive blasting equipment is moved to the location of the storage tank, be it water or petroleum, where the abrasive blasting work is to be done to the interior and/or exterior of the storage tank, as required. In shipyard work, the abrasive blasting equipment may be used in a dry dock, outside the dry dock, or placed some distance from the surfaces being cleaned. On a typical ship, the surface area of the internal ballast and fuel tanks is often 17 times as great as the actual surface of the hull of the vessel.

Management of the Abrasive Blasting Process

Because the abrasive blasting process, whether fixed or mobile, requires large amounts of complex blasting equipment and manpower to operate and manage the equipment, the hourly cost of fixed or mobile work is substantial. Recent increases in the cost of energy, both electric or diesel, labor, blasting media, and waste disposal, all serve to drive up the cost of the abrasive blasting process. With the worldwide cost of steel increasing, the abrasive blasting process is even more important as the protection the abrasive blasting process provides can substantially extend the life of steel structures, which are now far more expensive based on the increased cost of steel. In addition to the cost of steel and other materials increasing, labor costs have also increased.

Monitoring and Managing the Abrasive Blasting Process

Abrasive blasting machines in their current mobile and fixed configurations have been available for approximately 35 years. Throughout this period, abrasive blasting machines have been configured using rudimentary equipment (e.g., blowers, compressors, mixers, valves). Owners (e.g., construction companies) of abrasive blasting machines have had little actual machine operational data to use in managing the abrasive blasting machines. The owners/operators generally have a supervisor and crew that operate the abrasive blasting machine while on a job site. Operational data has been primarily empirically collected after the fact using a macroscopic view (e.g., approximately two days to complete a 450 square foot section of a steel bridge structure), and detailed operational data that would provide an owner with more insight as to the efficiency of the supervisor, crew, and abrasive blasting machine has not been available due to the equipment being so rudimentary.

While owners of the abrasive blasting equipment have had little actual information to use in managing the equipment and its crew, customers (e.g., municipalities) of the owners have had even less information to ensure that its structures were being timely and efficiently handled in preparing the structure for coatings and other maintenance efforts. Moreover, given the large number of ongoing construction projects that customers generally have at any given time, it has been difficult for a supervisor to effectively know what structures are being prepared by abrasive blasting equipment and current status of the abrasive blasting processes. Ultimately, due to the lack of actual data being available to customers of abrasion blasting equipment, inefficiency, waste, and fraud have resulted in certain cases.

Maintenance of Abrasion Blasting Equipment

With regard to maintenance of abrasion blasting equipment, as those skilled in the art of abrasive blasting can testify, owners and operators of abrasive blasting equipment do little by way of preventative maintenance and tend to operate on a "run it until it breaks" mode. Each piece of abrasive blasting equipment is composed of thousands of parts, including electrical, mechanical, and electromechanical components. When one of the components fails, a technician is brought in to fix the problem. Often, components have certain lead times (e.g., three days) before the component can be obtained and installed by the technician. Such downtime is expensive due to the crew not producing and contract dates slipping. In addition, equipment failure may lead to inefficient operation of the abrasive blasting machine or the appearance of inefficient operation. Either way, the manufacturer of the machine has the potential to lose future business, the owner/operator has the potential to lose customers, and the end customer has the potential to lose money—a bad situation for all involved.

SUMMARY

To overcome the problems and shortcomings of the abrasive blasting industry that has existed for many years, intelligence may be added to abrasive blasting equipment. Intelligence may be added to abrasive blasting equipment through the use of sensors and computers and provide for monitoring, collecting, processing, and presenting operational data produced by an abrasive blasting equipment. Such data may enable owners/operators and end customers to have significantly more information than previously available and improve efficiency in the industry. Two fundamental areas are addressed by using the principles of the present invention, including (i) management, which may include both (a) management by the owner/operator of the abrasive blasting machines and (b) management of structure projects by end customers (e.g., municipalities, oil companies, U.S. Navy), and (ii) maintenance of abrasive blasting machines, which may result in less downtime of the machines.

One embodiment of an abrasive blasting system may include a blower configured to blow air to create an airflow. A metering valve may be configured to mix blast media into the airflow. A controller may be in communication with said blower and the metering valve. A blasting hose in fluid communication with the blower. A nozzle may be connected to an end of said blasting hose. A control switch may be connected to the nozzle and be configured to enable an operator to (i) selectively cause the controller to cause the airflow created by the blower to pass through the blasting hose and nozzle in response to the control switch being in a first state, and (ii) selectively cause the metering valve to mix the blast media with the airflow for passing the blast media through the blasting hose and nozzle in response to the control switch being in a second state. A timer may be in communication with the controller and be configured to time duration that the metering valve is being operated to mix the blasting media with the airflow to enable the operator to perform abrasive blasting. A user interface may be in communication with the controller to enable a user to display the duration that the operator is performing abrasive blasting.

One embodiment of a method for managing abrasive blasting may include timing duration of blast media being blown in performing abrasive blasting using an abrasive blasting machine. Time duration that an operator worked in association with the duration of the blast media being blown may be received. A blasting efficiency ratio may be computed based on the duration of the blasting media being blown and duration of that the operator worked. The blasting efficiency ratio may be displayed to a user.

One method for managing a fleet of abrasive blasting machines may include collecting operational data produced by a plurality of abrasive blasting machines at a remote computing system from the abrasive blasting machines. The collected operational data may be stored in a data repository. At least a portion of the collected operational data may be displayed for a user to view.

One embodiment of a method for maintaining an abrasive blasting machine may include establishing, in an electronic memory, a set of preventative maintenance parameters associated with a respective set of components of the abrasive blasting machine. Sensors that collect operational data of components of the abrasive blasting machine that correlate to the set of preventative maintenance parameters may be monitored. A determination that operational data of a component has crossed a preventative maintenance parameter may be made. In response to determining that the operational data of the component crossed a preventative maintenance parameter, a user may be notified to perform preventative maintenance on the component of the abrasive blasting machine.

One embodiment of a jobsite communications system for communicating abrasive blasting messages to operators at a jobsite may include a transceiver configured with preset message elements activatable by an operator to communicate a preset message associated with abrasive blasting. A signaling system reporter may be configured to receive the preset message associated with abrasive blasting and display the preset message for another operator. The signaling system reporter may be configured as part of an abrasive blasting machine or be separate from the machine. The transceiver may be attached to a nozzle of a blast hose or be separate therefrom.

One embodiment of a method for providing communications between workers of an abrasive blasting machine on a jobsite may include communicating a preset message related to abrasive blasting operations to another device in response to an operator selecting to send the preset message, and displaying the preset message for another operator to view.

BRIEF DESCRIPTION

Illustrative embodiments of the present invention are described in detail below with reference to the attached drawing figures, which are incorporated by reference herein and wherein:

FIG. 13 is a screenshot of an illustrative GUI that provides for preventative maintenance information of abrasive blasting machines and a maintenance log of maintenance performed on components of the abrasive blasting machines;

DETAILED DESCRIPTION

Figure 1:
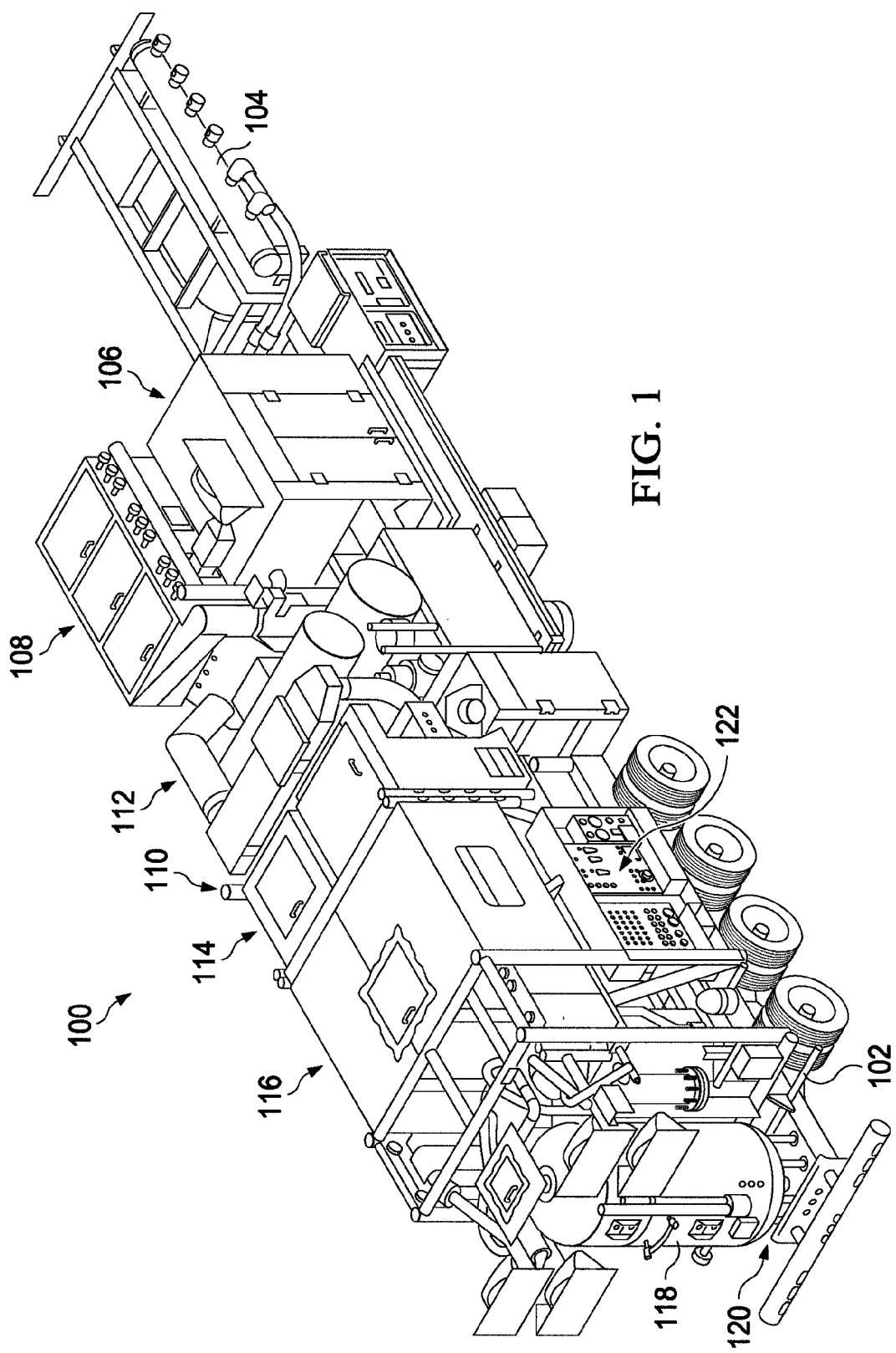
FIG. 1 is an isometric view of an illustrative mobile abrasive blasting machine that includes a controller for use in monitoring, collecting, and processing sensor data measured from components of the abrasive blasting machine.

With regard to FIG. 1, an illustration of an illustrative abrasive blasting machine 100 is shown. The abrasive blasting machine 100 in this configuration is mobile in that it resides on a trailer 102 that enables the abrasive blasting machine 100 to be transported from job site to job site for performing abrasive blasting on a structure (e.g., bridge) at the job site. From front to rear, the abrasive blasting machine 100 includes a compressor manifold 104 that enables multiple compressors to feed into the manifold 104 for use in blowing blast media by the abrasive blasting machine 100. An engine 106, which may be a diesel engine or other powered engine, for use in producing vacuum power and generating hydraulic power for driving various components on the abrasive blasting machine 100. A vacuum 108 may be utilized to enable an operator of the abrasive blasting machine 100 to vacuum blast media after the blast media is projected onto surfaces of a structure being prepared for a protective coating to be applied thereto. An air wash 110 may be utilized to cleanse dust that is collected by the vacuum 108. A pre-classifier 112 may be utilized to sort out debris or other material that is collected by the vacuum and greater than a certain size, such as three-sixteenths of an inch. A classifier 114, such as a magnetic drum, may be configured to sort or otherwise separate the blast media, such as steel grit, from other debris, such as paint chips, that are collected by the vacuum process.

A storage hopper 116 may be utilized to store blast media that is utilized for performing the abrasive blasting by the abrasive blasting machine 100. A pressure vessel 118 may be utilized to generate a pressure for the blast media in being introduced into airflow created by a compressor. The pressure vessel 118 is in fluid communication with metering valves 120 that are selectively open and shut for introducing the blast media into airflow produced by the compressor for use in blowing the blast media onto surfaces of a structure being prepared for a protective coating to be applied thereto. In operation, airflow without blast media may be created and used by an operator of a blast hose (not shown) that includes a nozzle (not shown). Blast media may be selectively added to the airflow and directed onto surfaces of a structure. As understood in the art, the nozzle of a blast hose may include a "dead-man" switch (not shown) that, when in a first position, causes compressed airflow to be pushed through the blast hose and nozzle, and, when in a second position, causes both airflow and blast media to be pushed through the blast hose and nozzle. As further described herein below, the dead-man switch may be in communication with a controller 122 and/or other valve control circuitry (not shown) that causes the airflow and/or blast media to be blown through the blast hose and nozzle. Alternative control switches may be utilized in accordance with the principles of the present invention.

The controller 122 may be part of the abrasive blasting machine 100 and used to control components of the abrasive blasting machine 100. The controller 122 may further be configured to collect and process sensor data from sensors that are applied to sense operation of various components of the abrasive blasting machine 100. The controller 122, which is fundamentally a processing unit that performs control and data collection functionality, may be composed of one or more computer processors and other circuitry. The controller may be utilized in a manner that generates "intelligence" for owners/operators and customers of the owners/operators of the abrasive blasting machine. As described further herein, the information and statistics that may be collected and generated have heretofore not been available to owners/operators and end customers of abrasive blasting machines.

Figure 2:
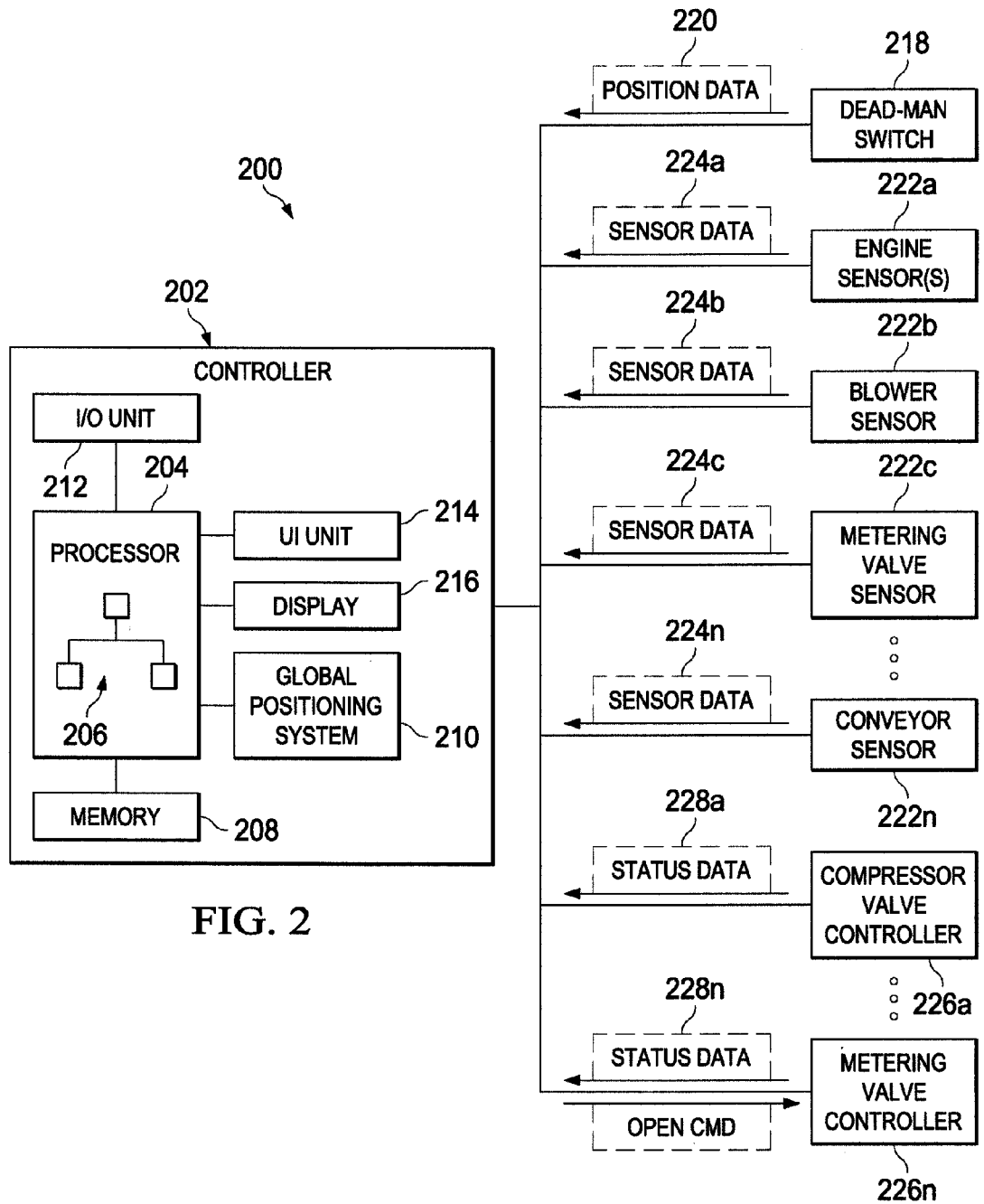
FIG. 2 is a block diagram of an illustrative electrical system that includes a controller configured to receive control and sensor data and generating control information to control components of the abrasive blasting machine.

With regard to FIG. 2, a block diagram of an illustrative electrical system 200 that includes a controller 202 is shown. The controller 202 may include one or more computer processors 204 that are configured to execute software 206. The software 206 may be configured to provide both control and data collection functionality in accordance with the principles of the present invention. Furthermore, the software 206 may be configured to generate statistics and other operational and maintenance information, as further provided herein. The processing unit 204 may be in communication with a (i) memory 208 that may be configured to store data, such as clock times produced by timers that are utilized to determine how long certain operations of the abrasive blasting machine have been operating, (ii) global positioning system 210 that may be configured to collect global positioning information of the abrasive blasting machine, (iii) input/output unit 212 that may be configured to provide for both local communications on the abrasive blasting machine and remote communications with a communications network, such as a mobile telephone network or satellite communications network. The processing unit 204 may further be in communication with a (iv) user interface unit 214 that may include a keyboard, pointing device (e.g., computer mouse or touchpad for controlling a cursor on an electronic display), and (v) electronic display 216, which may be a traditional electronic display, such as an LCD display, or touch screen display that enables a user to control and interact with data being displayed on the electronic display 216. Although a GPS system is shown, alternative geographic location determination techniques may be utilized, such as triangulation using mobile telephone signal techniques, as understood in the art.

A blast control switch 218, such as a "dead-man" switch, which may be operated by a blast hose operator and be configured in one or multiple position to enable the blast hose operator to direct compressed air or compressed air with blast media, may be positioned on a nozzle. In one embodiment the control switch 218 is a single pole, double throw switch, as understood in the art. The blast control switch 218, if not being actively forced to a position, will automatically be forced back to a neutral position, which causes both air and blast media to be prevented from being blown through the blast hose and nozzle, as understood in the art. The blast control switch 218 may generate a position data signal 220, which may be in the form of an electrical signal (e.g., +/−5V) or data signal (e.g., data bits representing a position at which the blast control switch 218 is positioned). The position data signal 220 may be communicated to the controller 202 for allowing the controller 202 to communicate a control signal to one or more valves for allowing airflow through the blast hose and nozzle and metering valve (not shown) that mixes blast media in the airflow. The controller 202 may further be configured to initiate a timer to record an amount of time that the airflow and/or blast media is being used by an operator of the blast hose. In an alternative configuration, the position data signal 220 from the blast control switch 218 may be communicated directly to an electronic circuit that controls one or more valves that enables the airflow and blast media to be passed through the blast hose. In this configuration, the controller 202 may receive a communications signal from the electronic circuit for controlling the valves to indicate that the operator of the blast hose is using air and/or blast media. In response, the controller 202 may initiate timers, one for the air and one for the blast media, which are independent of one another, for use in monitoring the length of time that air and blast media are respectively being used. In one embodiment, both a daily and a lifetime timer may be used for each of the components, thereby enabling the controller 202 to effectively determine daily and lifetime usage of the compressor, blast hose, blast nozzle, and any other component that may have a limited lifetime and require preventative maintenance to replace and/or repair the components to maximize usage of the abrasive blasting machine without downtime.

Sensors 222*a*-222*n* (collectively 222) may be applied to components of the abrasive blasting machine that a manufacturer, owner, or operator of the abrasive blasting machine may desire to monitor in generating statistical information, maintenance information, operational information, or other information, as provided herein. For example, the sensors may be applied to the engine, blower, metering valve, conveyor, or any other component (e.g., compressor) of the abrasive blasting machine. The sensors 222 may communicate sensor data 224*a*-224*n*, respectively, to the controller 202 for collection, storage, processing, and/or communication. The controller 202 may further be in communication with a number of controllers 226*a*-226*n*, such as a compressor valve controller and a metering valve controller. The controllers 226*a*-226*n* may be in communication and controlled by the controller 202. Alternatively, the controllers 226*a*-226*n* may communicate operational data, such as valve open and valve closed data signals, to acknowledge or notify the controller 202 of operation of the valves. In one embodiment, status data 228*a*-228*n* (collectively 228) may be communicated to the controller 202 from the controllers 226*a*-226*n*, respectively. In one embodiment, a conventional communications bus may be utilized to provide communications between the controllers 202, dead-man switch 218, sensors 222, controllers 226, etc.

Figure 3:
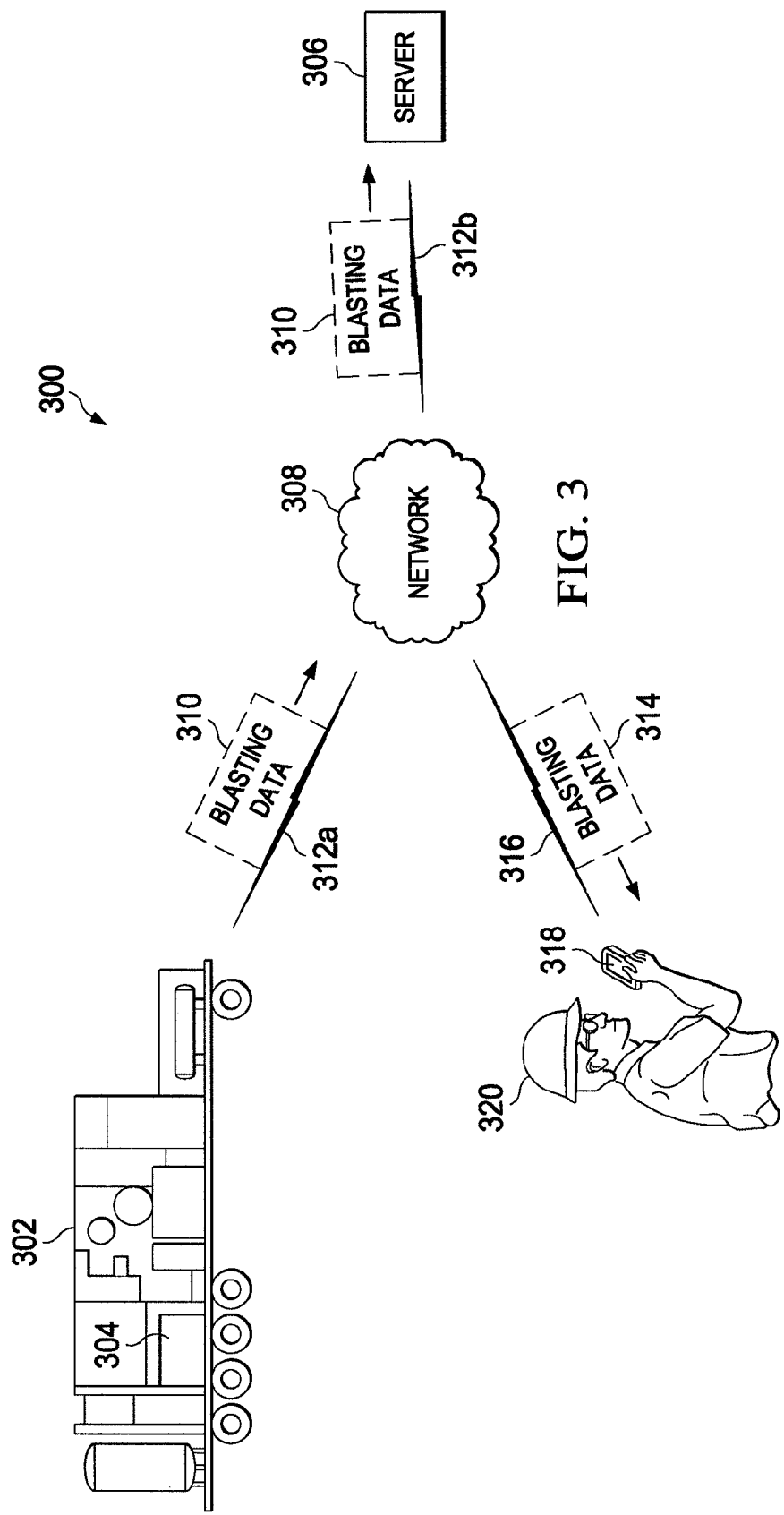
FIG. 3 is an illustration of an illustrative network environment in which an abrasive blasting machine communicates blasting data to a remote server located on a network.

FIG. 3 is an illustration of an illustrative network 300 that includes an abrasive blasting machine 302 that includes a controller 304 that is configured to communicate with a server 306 that is remotely located from the abrasive blasting machine 302 via a communications network 308. The communications network 308 may be a mobile telephone network, satellite communications network, or any other communications network, as understood in the art. The controller 304 may be configured to communicate blasting data 310, which may include operational data, maintenance data, current status data, or any other data that may be utilized by an owner, operator, or end customer of the abrasive blasting machine 302. The blasting data 310 may be communicated via a communications channel 312*a* between the abrasive blasting machine 302 and communications network 308, and via a communications channel 312*b* via the communications network 308 and server 306. The communications channel 312*a* may be a wireless communications channel as the abrasive blasting machine 302 is mobile and may be routinely moved from job site to job site. If the abrasive blasting machine 302 is stationary and can be connected via a wired connection, then the communications channel 312*a* may be a wired communications channel to the communications network 308, such as the Internet. The communications channel 312*b* may be wireless or wired, as understood in the art.

The server 306 may be configured to receive and/or communicate with one or more abrasive blasting machines that are being operated by one or more different operators. The server 306 may be configured to receive, store, process, and display data collected by the abrasive blasting machine 302 via the network 308 or at a local communications network (not shown) to the server 306. In one embodiment, blasting data 314, which may be the same or a derivative of blasting data 310, may be communicated via a communications channel 316 to a mobile device 318 for processing and/or displaying thereon. In one embodiment, the mobile device 318 may be a mobile telephone, smart personal digital assistant (PDA), portable computer, tablet, or any other computing device, as understood in the art. The mobile device 318 may execute an application that enables a user 320 to interface with the data, such as selecting different parameters to view that are indicative of current or historical operation of the abrasive blasting machine 302. The communications channel 316 may be a communications channel between the network 308 and mobile device 318. Alternatively, the communications channel 316 may be communicated directly from the controller 304 to the mobile communications device 318 using WiFi®, Bluetooth®, or in any other local communications protocol, as understood in the art.

Figure 4:
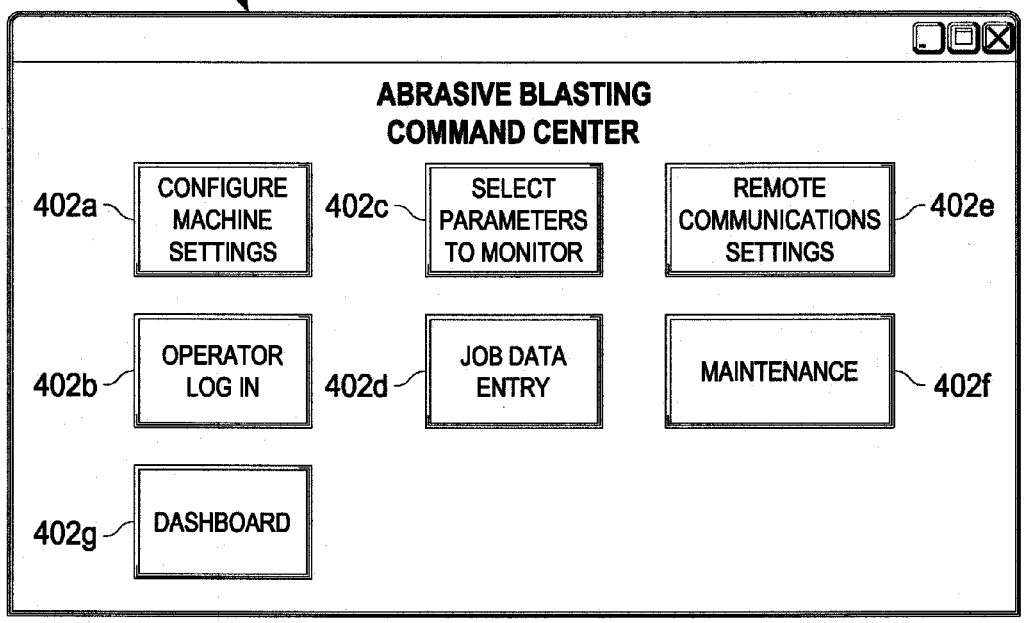
FIG. 4 is a screenshot of an illustrative graphical user interface (GUI) that enables a user to manage and maintain an abrasive blasting machine.

With regard to FIG. 4, a screenshot of an illustrative GUI 400 is shown. The GUI 400 may include a number of selectable soft-buttons 402*a*-402*g* (collectively 402). The soft-buttons 402 may be used in the event that an abrasive blasting machine includes a touch-screen for interfacing with a controller of the abrasive blasting machine or that the abrasive blasting machine includes a pointing device, such as a computer mouse, that enables a user to control a cursor to enable a user to select one of the soft-buttons 402. It should be understood that the GUI 400 may utilize alternative user interface elements, as understood in the art.

A "configure machine settings" soft-button 402*a* may enable a user to selectively configure settings for operation, control, and data collection from sensors of the abrasive blasting machine. The machine settings may include vacuum pressure, blower pressure, conveyor speed, blast media mixing rates, or any other component operation that may be variably set, as understood in the art. The settings may also include sensor reading rates (e.g., readings per second, readings per hour, readings per day), event triggers that cause data to be communicated to the controller (e.g., dead-man switch toggle), or any other settings, as understood in the art. These settings may also include the ability to set times or events that cause the controller of the abrasive blasting machine to communicate data via a communications network to a remote server. For example, the settings may include notifying or communicating status data to the remote server in response to the machine turning on, blasting being initiated or turned off, or any other status update, as understood in the art. In addition, the settings may enable for data to be stored at the controller throughout an entire day and communicated daily or when the controller is able to communicate with a communications network, as understood in the art, since the abrasive blasting machine may be positioned in a location (e.g., within a tunnel) that the controller is unable to have communication with the communications network.

An "operator log in" soft-button 402b may enable a user to log into the controller to capture operator numbers and times that the operator logs in or logs out of the controller. In effect, capturing operator login and logout times may provide a tool for tracking when an operator arrives and leaves a job site. In selecting the operator log in soft-button 402b, the user may be presented an operator log in GUI, such as that shown in FIG. 5.

A "select parameters to monitor" soft-button 402c may enable a user to select what parameters of the abrasive blasting machine to monitor. The available parameters may be provided on a screen (see FIG. 7) to enable the user to select available parameters through the use of sensors and a controller included on the abrasive blasting machine.

A "job data entry" soft-button 402d may enable a user to enter job information prior to and/or after work being performed on a job site each day. In response to selecting the job data entry soft-button 402d, a GUI, such as that shown in FIG. 6, may be presented to the user to select or otherwise enter data associated with the job being performed by the abrasive blasting machine.

A "remote communications settings" soft-button 402e may enable the user to select remote communications operations by the controller of the abrasive blasting machine with a remote server or other remote communications device, such a mobile communications device being used local to the abrasive blasting machine. The remote communications may include setting up scheduled times or events that trigger the controller to communicate data collected during a workday to communicate to the remote server. The remote communications settings may also enable for communicating current status, maintenance operations, and any other information collected from or generated by the controller of the abrasive blasting machine.

A "maintenance" soft-button 402f enables the user to actively interface with a maintenance graphical user interface (see FIG. 9) for viewing current maintenance status (e.g., number of hours currently used of one or more components of the abrasive blasting machine versus total number of hours available of use on each of the respective components of the abrasive blasting machine). In one embodiment, the maintenance soft-button 402f is made available only to technicians of the abrasive blasting machine by requiring the technician to enter a password prior to viewing a maintenance GUI (e.g., FIG. 9).

A "dashboard" soft-button 402g enables a user to actively view operational data on a GUI (see FIG. 8) to view one or more operating parameters being collected by sensors and stored and processed by the controller of the abrasive blasting machine. It should be understood that one or more "dashboard" soft-buttons may be available for enabling a user to selectively view different types of operational parameters that are being collected by or generated by the controller.

Figure 5:
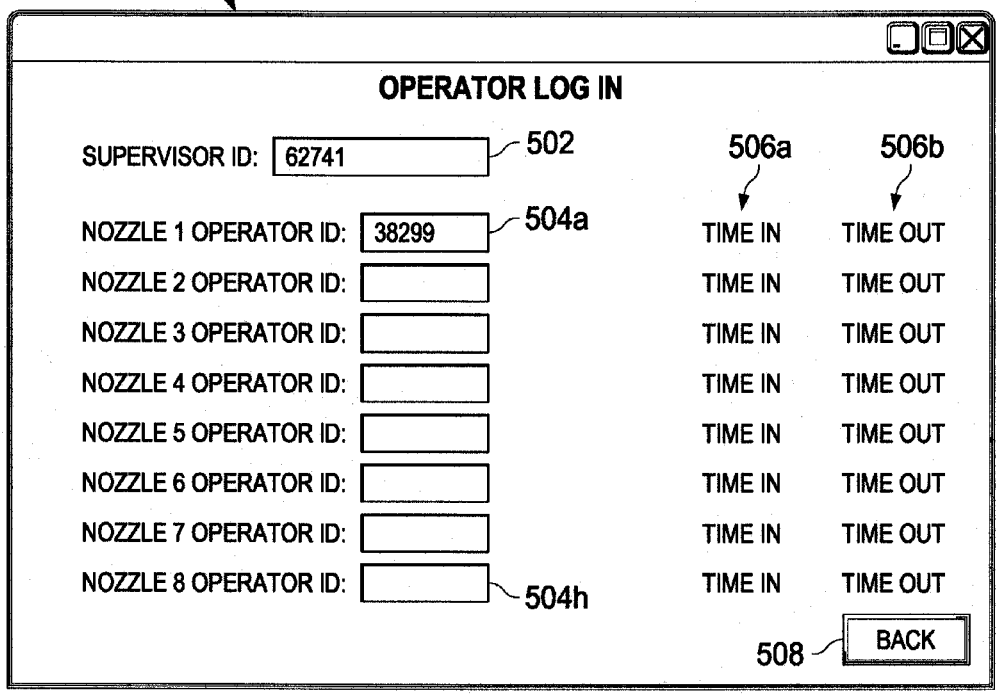
FIG. 5 is a screenshot of an illustrative GUI that enables operators of an abrasive blasting machine to enter operator IDs when operating the abrasive blasting machine.

With regard to FIG. 5, a screenshot of an illustrative GUI 500 that enables an operator to enter his or her employee ID or other identifier may be provided. As shown, a supervisor may enter his or her ID in text entry field 502 and nozzle operators may enter their operator IDs in text entry fields 504a-504h (collectively 504). Vacuum operators, technicians, or any other operator that interfaces with the abrasive blasting machine may be enabled to enter his or her employee ID or operator ID, as well. Although shown as a text entry field, the operators may alternatively be enabled to use a barcode scanner, magnetic strip scanner, radio frequency identifier transceiver, or any other technique for capturing an identifier associated with an operator of the abrasive blasting machine. The use of an RFID transceiver, for example, may track that operators are within a certain vicinity of the abrasive blasting machine (e.g., within 300 feet). Because jobsites can be larger than local wireless communications ranges, remote RFID transceivers and repeaters may be set up on the jobsite so that RFID tags or other communications devices of operators or workers may be sensed and reported to the controller. The GUI 500 may also be configured with "time in" and "time out" selectable fields 506a and 506b, respectively, that enables the controller on the abrasive blasting machine to operate as an electronic punch card to allow the owner/operator to determine when operators of the abrasive blasting machine arrive and leave from a job site or take lunch breaks, etc. If a user has finished entering his or her log in, then the user may select a "back" soft-button 508 to return to the GUI 400 of FIG. 4. It should be understood that the operator log in GUI 500 may have alternative configurations that enable users to selectively enter or select from a menu his or her user ID.

Figure 6:
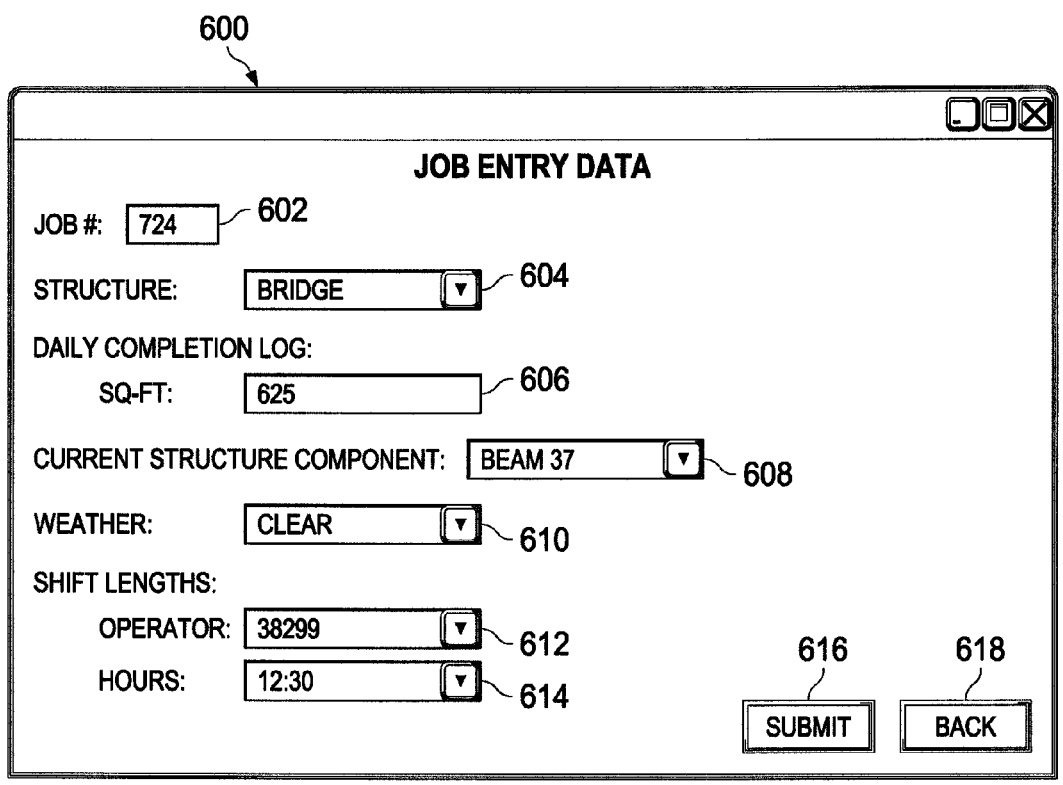
FIG. 6 is a screenshot of an illustrative GUI that enables a supervisor or other user to enter daily status information to provide for better tracking of operation of an abrasive blasting machine.

With regard to FIG. 6, a screenshot of an illustrative GUI 600 for a user to enter job data is shown. Typically, the user is a supervisor of an abrasive blasting machine at a job site who enters job entry data before and/or after a day on the job site. In one embodiment, the job entry data that may be entered may include a job number into text entry field 602, structure type in text entry field 604, daily completion log in square-feet or other metric in text entry field 606, current structure component in text entry field 608, and weather conditions in text entry field 610. In addition, the supervisor may enter shift lengths for each of the operators by selecting an operator ID in text entry field 612 and shift length in text entry field 614. It should be understood that each of the text entry fields may have a pull-down menu that may be filled in a data repository at the controller by a user of the controller or remotely from a remote server. If the user is satisfied with entries made in the job data entry GUI 600, the user may select a "submit" soft-button 616. Once complete, the user may select a "back" soft-button 618 for returning to a previous menu, such as GUI 400 of FIG. 4. It should be understood that alternative configurations of the GUI 600 may be utilized, such as automatically listing all of the operators who entered their presence at the job site in FIG. 5 and providing for entry of respective shift times.

Figure 7:
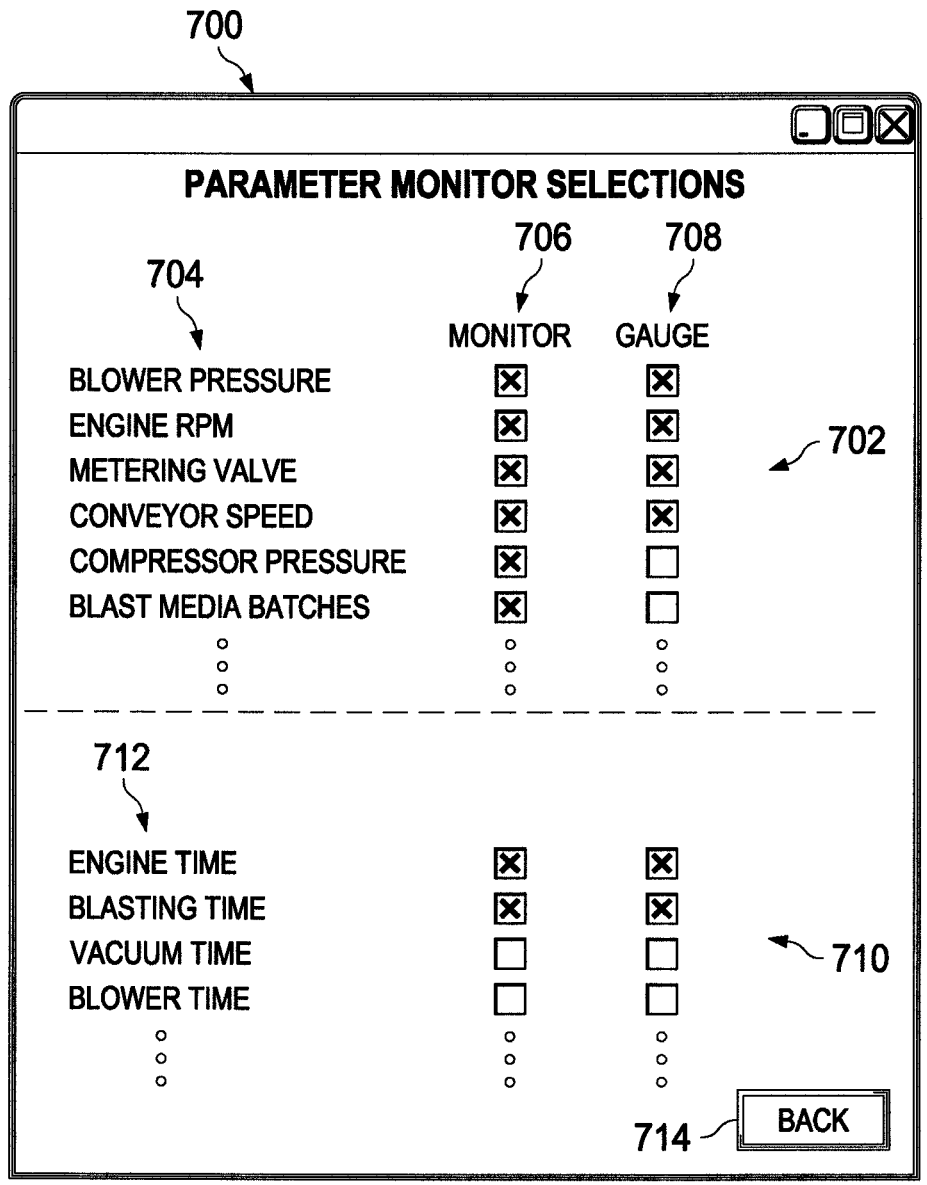
FIG. 7 is a screenshot of a GUI with an illustrative list of parameters that may be selectably tracked by a computing unit of an abrasive blasting machine.

With regard to FIG. 7, a screenshot of an illustrative GUI 700 that enables a user to select parameters to monitor on a dashboard screen is provided. The GUI 700 may include a section 702 with a list of selectable parameters 704. A list of available parameters 704 are listed with selectable graphical user elements 706 and 708 that allow the user to selectively monitor and/or display a virtual gauge of the parameter. As shown, the user has selected to both monitor and show a virtual gauge for blower pressure, engine RPM, metering valve, and conveyor speed, but not show a gauge for compressor pressure or blast media batches. The virtual gauges and monitor listings are illustratively shown in FIG. 8.

The GUI 700 may also include a section 710 that includes a list of times 712 that may be monitored and/or gauged in a dashboard screen. The times, such as engine time, blasting time, vacuum time, blower time, etc., may be generated by hardware or software timers. If hardware timers are used, the timers sense activation and deactivation of an electronic circuit that engages a component of the abrasive blasting machine. If software timers are used, then the controller of the abrasive blasting machine receives a signal indicating start and stop times of components of the abrasive blasting machine. The timers may include lifetime timers of each component (i.e., from the installation of the component until the replacement of the component) and daily timers of the component, thereby enabling (i) a maintenance technician to know how much time each component has in its lifetime and (ii) management personnel to identify how much time each component is being used on a daily basis. It should be understood that the GUI 700 is illustrative and that alternative configurations of the GUI 700 may be utilized in accordance with the principles of the present invention. Still yet, rather than using a GUI to interface with the controller, hardware switches (e.g., dip switches) may be utilized to cause the controller to monitor and display parameters being collected from the abrasive blasting machine. Once complete, the user may select a "back" soft-button 714 to return to the GUI 400 of FIG. 4.

In addition to the parameters shown in FIG. 7, TABLE I below is an illustrative list of parameters that may additionally be available for collection by the controller of the abrasive blasting machine and/or remote server.

speed virtual gauge 810. In addition, engine time 812 and blasting time 814 clocks may be shown. The various virtual gauges 802-810 are illustrative and other forms of virtual gauges and other parameters of components of the abrasive blasting machine may be shown through use of selection elements 708 of FIG. 7. Alternatively, certain parameters may be fixedly shown while others may be selected to be shown (i.e., a hybrid custom dashboard). In addition, although not shown as virtual gauges, a listing of additional parameters of the abrasive blasting machine may be shown below the virtual gauges, such as compressor pressure 816 and blast media batches 818. In one embodiment, a table format may be utilized. Other formats may be utilized, as understood in the art, A "daily reset" soft-button 820 may be made available for a user, such as a supervisor, to select to reset the gauges on a daily basis after the parameter data is stored by a controller of the abrasive blasting machine. The user may select a "back" soft-button 822 to return to GUI 400 of FIG. 4.

Figure 9:
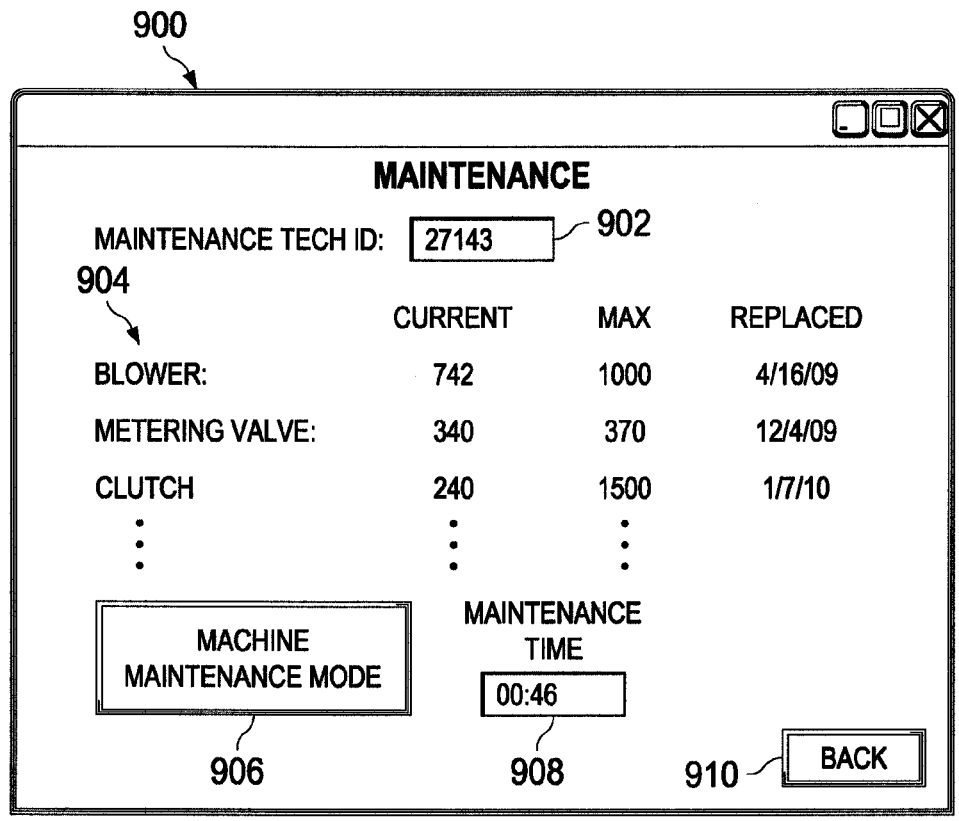
FIG. 9 is a screenshot of an illustrative GUI that enables a maintenance technician or other user to view current maintenance status and usage of components of an abrasive blasting machine.

Because maintenance is generally an issue for operating an abrasive blasting machine due to components either failing or having to be adjusted, replaced, retuned, or otherwise for preventative maintenance purposes, FIG. 9 shows a maintenance GUI 900 that allows a maintenance technician, who may enter his or her ID into a text entry field 902, to view a listing 904 of maintenance parameters. The maintenance parameters may include components that are typically scheduled for preventative maintenance based on a suggested or recommended number of hours or uses by a manufacturer. For example, a blower generally has 1,000 hours of time that it may be used before replacement is suggested by the blower manufacturer. Therefore, the controller may monitor the number of hours that the blower has been utilized and display the current number of lifetime hours and the maximum num-

TABLE I

| | | |
|---|---|---|
| GPS location | Power to abrasive blasting controls | Hydraulic pressures from different points in the system |
| Photographic conditions perhaps from numerous fixed or movable cameras | Power to individual blasting controls or circuits | Level conditions from different points in the system, dry or liquid, including fuel and water |
| Weather conditions | Power to metering valves | Totaling of batches moved through the system, with each one having a defined weight |
| Temperature | Power to air valves | Analysis of ratios of various readings |
| Humidity | Power to vacuums | Blast circuit (grit + air) ON time in relation to total time overall blast system is activated or just one circuit (one operator) is activated |
| Wind | Pneumatic pressures from different points in the system | Blast circuit (air only) ON time in relation to total time overall blast system is activated or just one circuit (one operator) is activated |
| Traffic conditions | Each air compressor | Blast circuit (grit and/or air) OFF time in relation to total time overall blast system is activated or just one circuit (one operator) is activated |
| Main power switched on | Manifold from numerous compressors | Air and hydraulic pressure high and low during overall system activation |
| Electric motor operation | Air dryers | Totaling of weight moved through a specific point in the system, such as blast grit vacuumed up or blast grit loaded into blast vessel |
| Diesel engine operation | Filters | Location of GPS transmitter over a period of time |
| Clutch application to drive vacuums or other devices | Pilot control lines to other devices such as metering valves | Shift period of vacuum operator |

Figure 8:
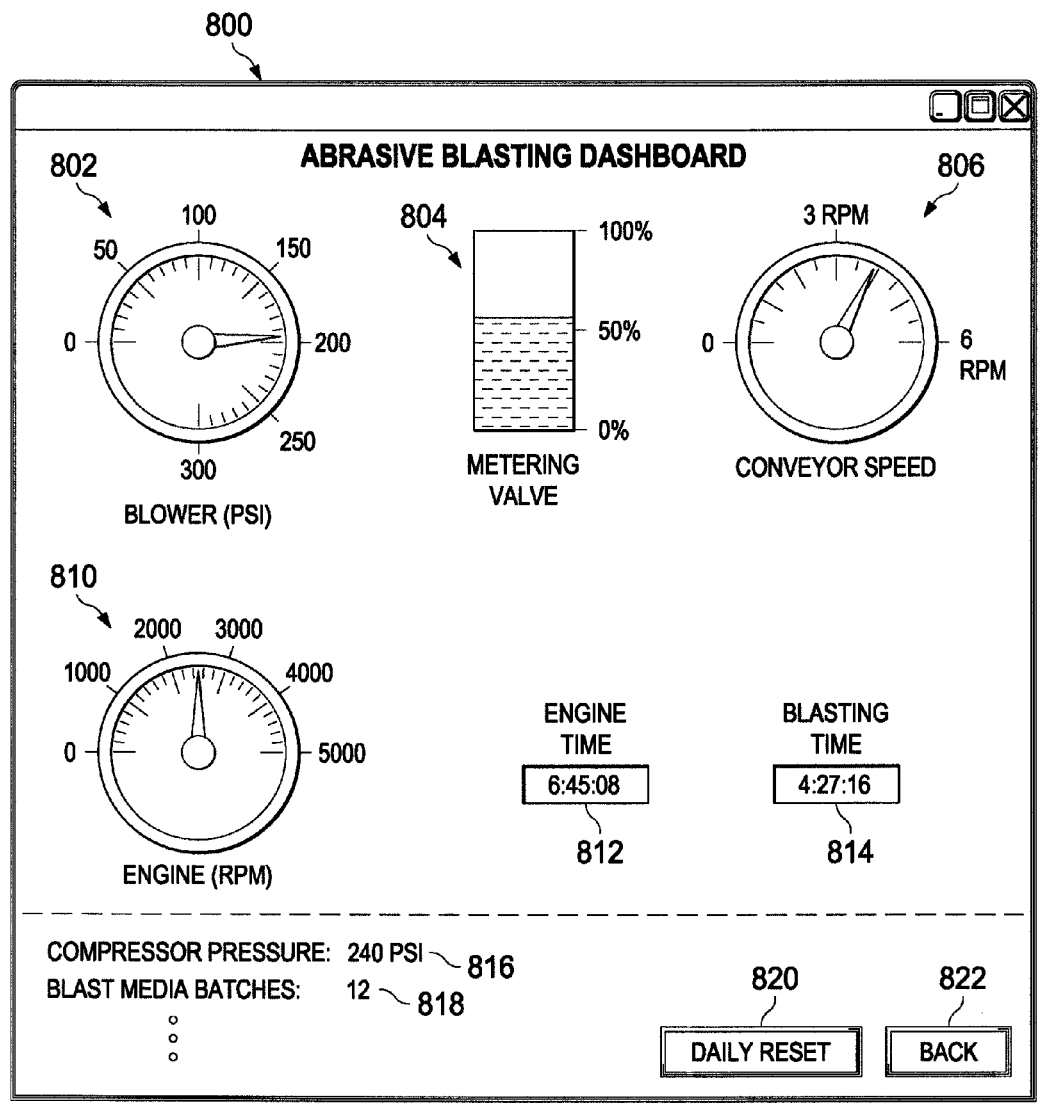
FIG. 8 is a screenshot of an illustrative GUI that provides a "dashboard" showing parameters being collected on an abrasive blasting machine.

With regard to FIG. 8, a screenshot of an illustrative abrasive blasting "dashboard" GUI 800 is shown. The GUI 800 may include a blower virtual gauge 802, metering valve virtual gauge 804, conveyor speed virtual gauge 806, and engine ber of hours. By doing so, a maintenance technician may monitor when to schedule replacement of the blower. In addition, a "replaced" date that the blower was replaced last may be listed. A projected replacement date (not shown) may be calculated based on historical usage of the abrasive blasting machine and displayed.

Should the maintenance technician have to perform maintenance on the machine, the maintenance technician may select a "machine maintenance mode" soft-button 906 that enables the machine to be placed in a maintenance mode, which may turn the machine off or put the machine into a particular state that allows the maintenance technician to replace or otherwise adjust a component of the abrasive blasting machine. In the event that the maintenance technician enters a maintenance mode, maintenance time may be displayed in a clock format in data field 908 to show the maintenance technician and/or supervisor how much time it has taken for the maintenance technician to repair the abrasive blasting machine. If the maintenance technician replaces a component, such as a blower, the maintenance technician may actively reset a current hours timer and date that the blower was replaced so that he or she and other personnel may be notified as to replacement of the blower for future planning purposes. Once complete, the user may select a "back" soft-button 910 to return to the GUI 400 of FIG. 4.

Figure 10:
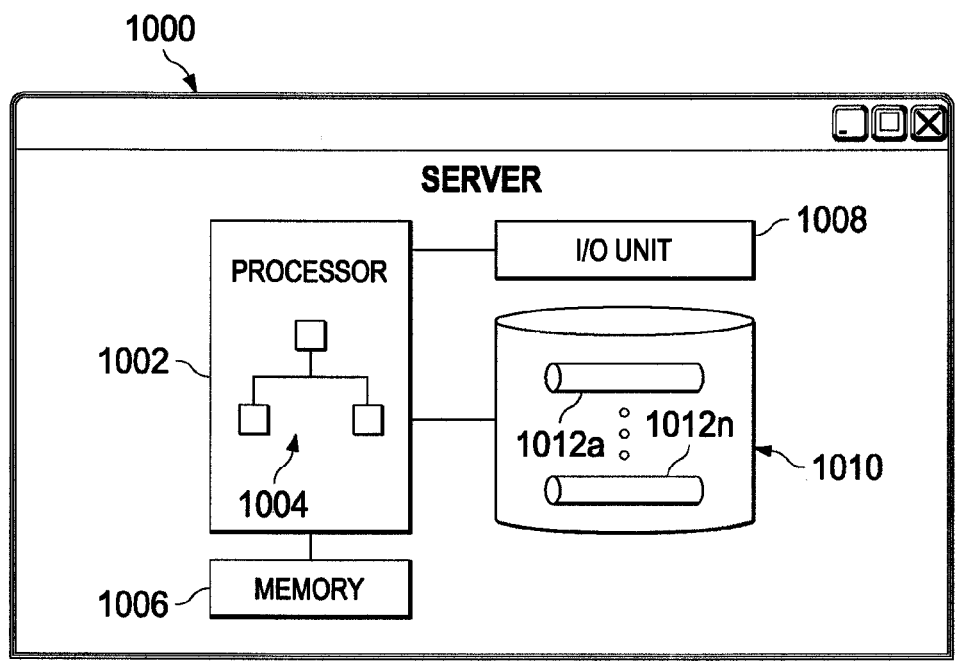
FIG. 10 is a block diagram of an illustrative server that may be located on a communications network that is configured to receive operational data from one or more abrasive blasting machines.

With regard to FIG. 10, a block diagram of an illustrative server 1000 is shown. The server 1000 may be remotely located from one or more abrasive blasting machines and used to collect data from each of the abrasive blasting machines for storage and processing of the data. The server 1000 may include a processing unit 1002 composed of one or more computer processors that execute software 1004. The software 1004 may be configured to receive, process, and display data collected from the abrasive blasting machines. A memory 1006 may be configured to store data during processing and software for execution on the processing unit 1002. The processing unit may be in communication with the memory 1006, input/output unit 1008, which may be configured to communicate data over one or more communications networks using any communications protocol, as understood in the art, and storage unit 1010. The storage unit 1010 may be configured to store one or more data repositories 1012*a*-1012*n* (collectively 1012). The data repositories may be configured to store data received from abrasive blasting machines. In addition, the data repositories 1012 may be configured to store data that is generated by the software 1004 in response to receiving operational and/or maintenance data from the abrasive blasting machines. The processing unit 1002 may be configured to communicate data stored in the data repositories 1012 via the I/O unit 1008 via a communications network (e.g., Internet, mobile communications network) to webpages or mobile devices, in accordance with the principles of the present invention. In one embodiment, in addition to the controller from the abrasive blasting machines "pushing" data to the server 1000, the server 1000 may allow for a user to "pull" data from the controllers of the abrasive blasting machines either automatically or manually.

Figure 11:
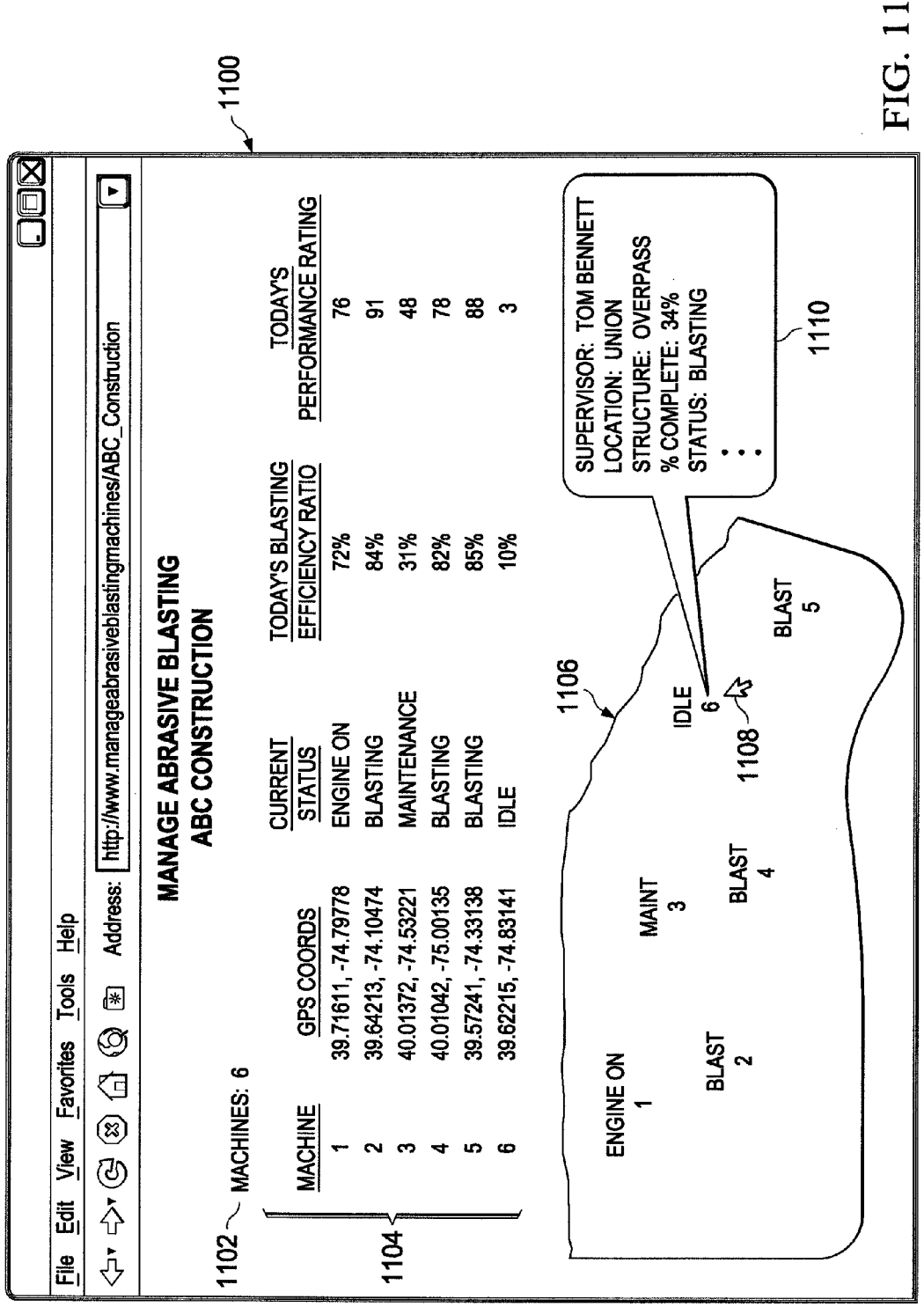
FIG. 11 is a screenshot of an illustrative GUI that may be viewed by a manager of one or more abrasive blasting machines to provide current status and management information.

With regard to FIG. 11, a screenshot of an illustrative GUI 1100 that may be displayed on a webpage or mobile device is shown. The GUI 1100 may be provided for an owner or operator of an abrasive blasting machine to view operational data. As shown, a number of machines that are being tracked may be shown in a data field 1102 and each of the machines may be listed in a table 1104. The table 1104 may include machine number or identifier, global positioning system (GPS) coordinates, current status of each of the abrasive blasting machines, today's blasting efficiency ratio, and today's performance rating. The blasting efficiency ratio may be a ratio of total time during the day that blasting is being performed versus total time that operators are at a job site (i.e., shift time). Alternative parameters may be utilized in generating a blasting efficiency ratio.

The performance rating may be based on a number of different factors, including blasting efficiency ratio, on-time percentage, blowing time percentage, square feet percentage of 1000 square feet, maintenance time percentage, dead-time percentage, weather conditions, temperature conditions, and so on. As an example, a performance rating may be computed by adding blasting efficiency percentage with blowing time percentage, subtracting maintenance time percentage, adding square feet percentage, and multiplying a scale factor based on weather conditions and temperature conditions. The performance rating may be computed over a certain time duration (e.g., daily) to enable an operator or end customer to track performance by using a performance rating, each abrasive blasting machine performance may be normalized against one another. The performance rating may be an industry standard or be particular to an owner or operator of the abrasive blasting machine.

In addition to the table 1104, a map 1106 may be displayed in a graphical format that shows where each of the respective abrasive blasting machines are located, their current status, and, in response to a user moving a cursor 1108 over the location of one of the abrasive blasting machines, a pop-up display 1110 may show specific details associated with the abrasive blasting machine. The details may include supervisor name, current location, structure being worked on, percentage complete, status, and any other data, as provided herein. It should be understood that the GUI 1100 may have an alternative configuration and provide the same or similar functionality as described herein.

Figure 12:
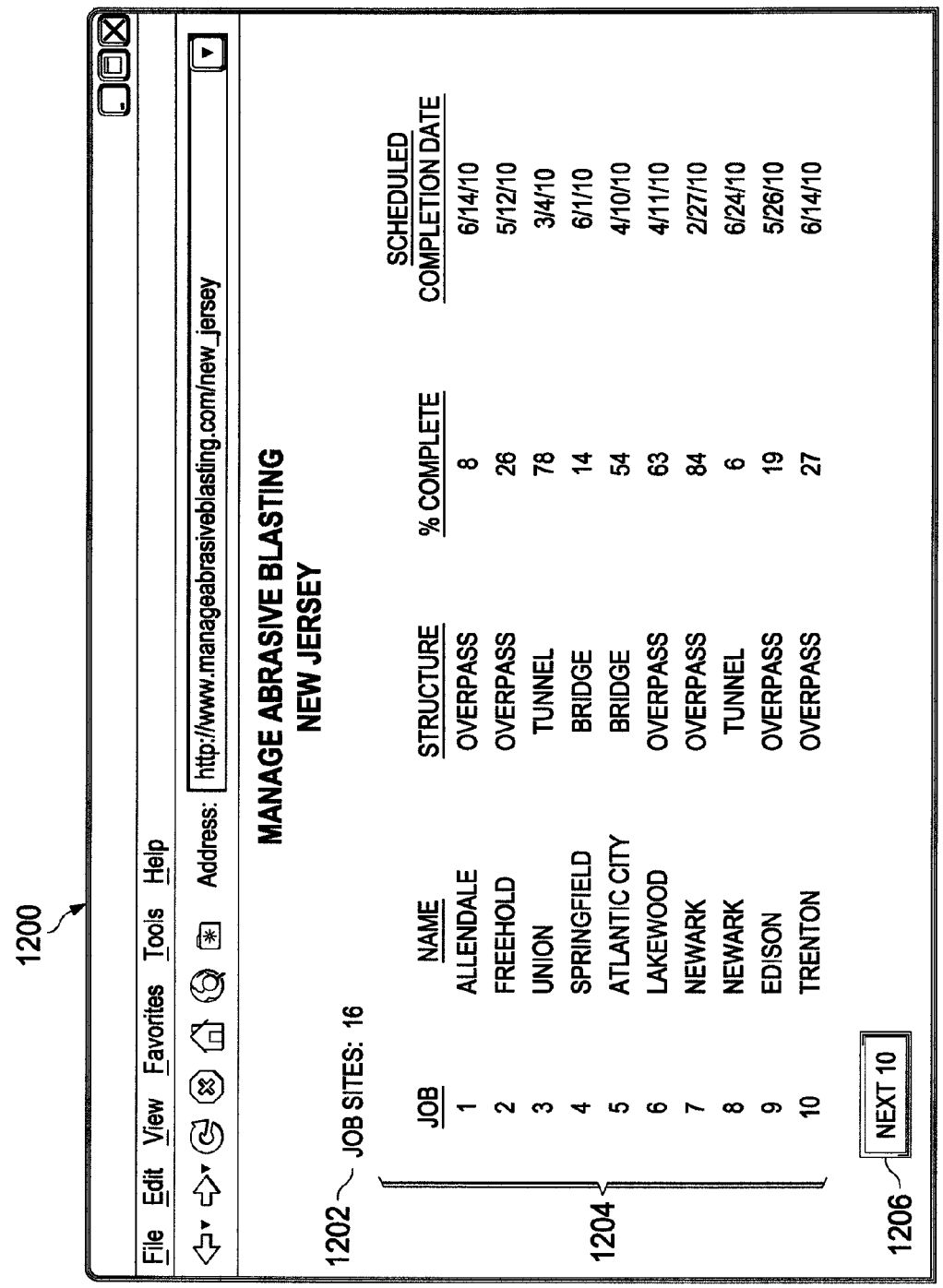
FIG. 12 is a screenshot of an illustrative GUI that may be utilized by a manager of an end customer of an owner/operator of an abrasive blasting machine for use in monitoring jobs and activities by the abrasive blasting machines being performed at those jobs.

With regard to FIG. 12, a screenshot of an illustrative GUI 1200 may be shown to enable an end customer, such as a municipality (e.g., State of New Jersey), to monitor current job sites that are being worked on by abrasive blasting machines. A number of job sites may be listed in a data field 1202 and a table 1204 may include a listing of each of the jobs that are being performed. The table 1204 may include job number, job name, structure type, percentage complete, and scheduled completion date for the abrasive blasting to be completed. Depending on the configuration of the GUI 1200, a "next 10" soft-button 1206 may be available for a user to actively view a next set of job sites that are actively being worked on by abrasive blasting machines. Other operational and status information that may be helpful to an end customer of the abrasive blasting machines may be displayed on the GUI 1200.

With regard to FIG. 13, a screenshot of an illustrative GUI 1300 may be shown to provide an owner and/or operator with preventative maintenance information to enable a maintenance technician or supervisor to manage maintenance operations of the abrasive blasting machines in its fleet. A table 1302 may include machine number, blower maintenance information (e.g., number of hours and total number of lifetime hours for replacement of the blower), clutch information (e.g., number of lifetime hours on the clutch versus total number of hours for replacement of the clutch), nozzles information (e.g., percentage of time used based on total number of hours available for use of each of the nozzles), blower valve information (e.g., number of hours used versus total number of hours available before replacement), etc. It should be understood that any number of formats for providing a user with preventative maintenance information for scheduling and replacing components of the abrasive blasting machine may be presented to a user. It should further be understood that as each component begins to reach its preventative maintenance limit, that the data may be displayed in a different color and/or a notification may be made to a user's e-mail address, mobile device, or simply displayed in a manner that alerts the user of an upcoming or past due preventative maintenance activity.

Another table 1304 showing a maintenance log may also be displayed in the GUI 1300. The maintenance log table 1304 may include machine identifier, history or date that an event took place, part name (e.g., nozzle 6), action taken (e.g., "preventative maintenance (pm) replacement"), technician name or identifier, and notes. The maintenance log table 1304 may be utilized to store both preventative maintenance and non-preventative maintenance (e.g., catastrophic failure of component). A user may enter information into the maintenance log table 1304 directly or via another GUI, as understood in the art. It should be understood that the maintenance log table 1304 may be filled by both maintenance updates performed at the abrasive blasting machine and remotely by a user via a web page, for example.

Figure 14:
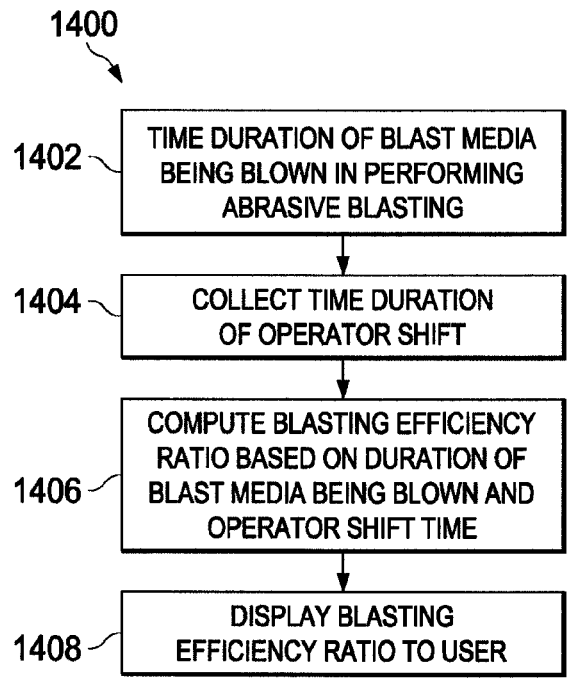
FIG. 14 is a flow diagram of an illustrative process that enables an owner/operator to view operational data collected from a processing unit on an abrasive blasting machine and processed for display to the user.

With regard to FIG. 14, a flowchart of an illustrative process 1400 may be utilized to collect and provide operational information to a user, such as a supervisor of an abrasive blasting machine. The process 1400 may start at step 1402, where a time duration of blast media being blown in performing abrasive blasting may be collected throughout a time duration. At step 1404, time duration of an operator shift (i.e., workday) may be collected. At step 1406, a blasting efficiency ratio may be computed based on duration of blast media being blown and operator shift time. The operator shift time may be collected by a supervisor or other personnel entering the operator shift time from his or her timesheet or from collecting the operator shift time from a controller on the abrasive blasting machine.

At step 1408, the blasting efficiency ratio may be displayed to a user. The user may use the blasting efficiency ratio to monitor performance of the operator, the operator's supervisor, machine operation, technician operation, and so on. In one embodiment, a software timer that is used to time duration of blast media may be operated by a controller on the abrasive blasting machine or a hardware timer that is in communication with a controller for a particular component (e.g., blower) may be used. In one embodiment, the computation of the blasting efficiency ratio or percentage may be performed remotely from the abrasive blasting machine. A global positioning system may be utilized to capture location of the abrasive blasting machine and provide geographic positioning information to a user in a table or a graphical format, such as on a map. Statistical information in addition to the blasting efficiency ratio associated with the operation of the abrasive blasting machine may also be displayed for the user. An overall performance rating that may be based on operational information collected by the abrasive blasting machine may be computed and presented to the user, as well.

Figure 15:
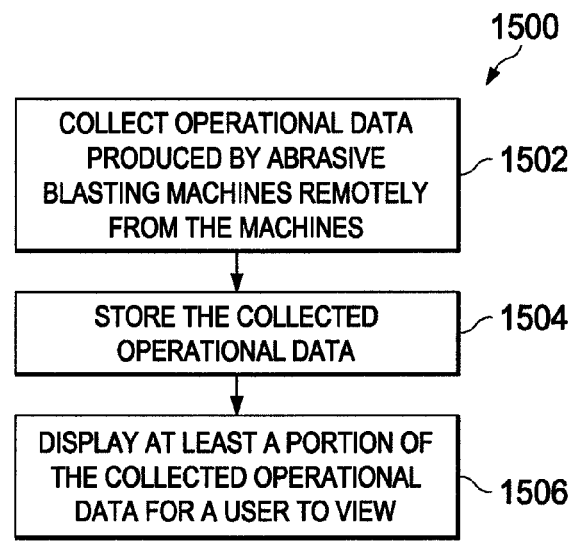
FIG. 15 is a flow diagram of an illustrative process that enables operational data produced by multiple abrasive blasting machines for display to a user for comparison purposes.

With regard to FIG. 15, a flow diagram of an illustrative process 1500 is shown. The process 1500 starts at step 1502, where operational data produced by multiple abrasive blasting machines may be collected remotely from the machines. In collecting the operational data, the operational data may be communicated from the abrasive blasting machines to a remote server for storage and processing purposes. At step 1504, the collected operational data may be stored in a data repository. At step 1506, at least a portion of the collected operational data may be displayed for a user to view. By presenting the user with collected operational data from multiple abrasive blasting machines, the operator may be able to view operation of an entire fleet of abrasive blasting machines, thereby enabling the user to identify trends of the machines, performance of supervisors, performance of operators, performance of technicians, and general progress being made by each of the abrasive blasting machines.

Figure 16:
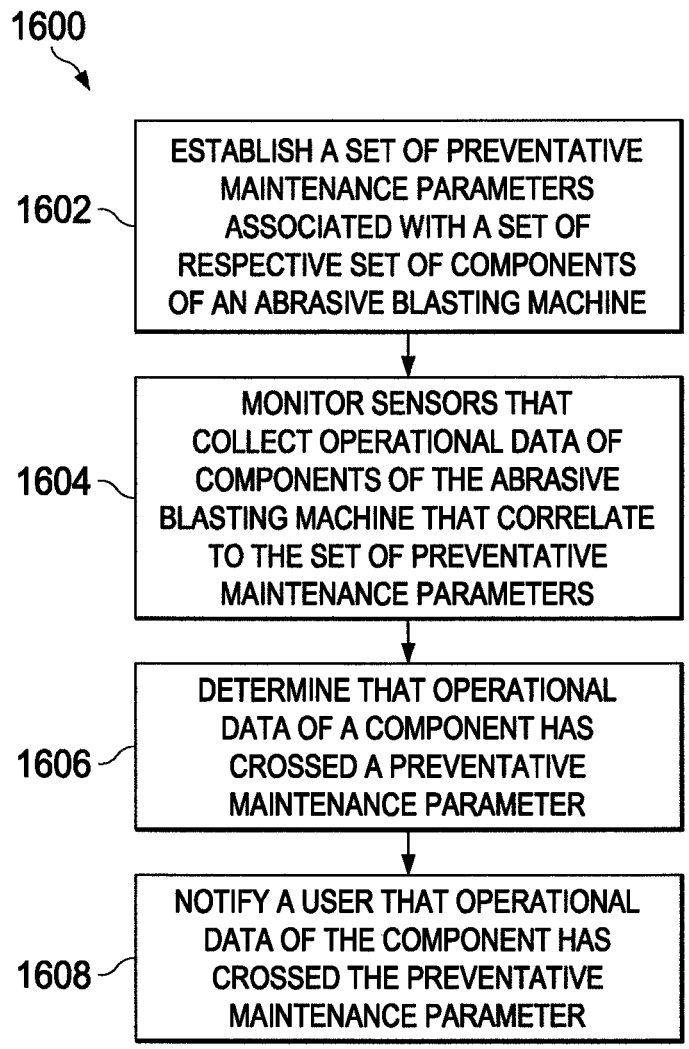
FIG. 16 is a flow diagram of an illustrative process that enables an owner/operator to efficiently perform preventative maintenance as a result of operational data being collected by an abrasive blasting machine.

With regard to FIG. 16, a flow diagram of an illustrative process 1600 for maintenance of an abrasive blasting machine is shown. The process 1600 starts at step 1602, where a set of preventative maintenance parameters associated with a set of respective set of components of an abrasive blasting machine may be established. In establishing the set of preventative maintenance parameters, a user may select which preventative maintenance parameters to monitor. For example, a user may select from available sensors on the abrasive blasting machine provided by a manufacturer of the abrasive blasting machine. At step 1604, sensors that collect operational data of components of the abrasive blasting machine that correlate to the set of preventative maintenance parameters may be monitored. The monitoring may be performed by a controller of the abrasive blasting machine. In one embodiment, the controller may use timers to time how long components are turned on throughout each day and/or over their lifetime. The sensors may also provide operational data that is representative of current operation, such as speed at which an engine is running.

At step 1606, a determination may be made that operational data of a component has crossed a preventative maintenance parameter (e.g., lifetime hours of a component exceeds recommended hours to replace component). In crossing a preventative maintenance parameter, at step 1608, a user may be notified that the operational data of the component has crossed a preventative maintenance parameter. For example, if a number of lifetime hours, for a particular component is 1,000, then at some threshold level (e.g., 10% below the operational parameter), the notification may be triggered to be provided to the operator. The notification may be in the form of a highlighted number on a table, e-mail notification, mobile notification, voice synthesized telephone call notification, or any other notification, as understood in the art. In one embodiment, the notification may come as a purchase order notification in an automated fashion from a system that is configured to automatically order replacement parts for delivery to an owner/operator for a maintenance technician to replace a component that is coming up for its preventative maintenance.

Because data generated and collected by abrasive blasting machines makes it possible to analyze an operation more completely, which would lead to higher overall efficiency, this data delivered to a customer in an organized manner has significant financial value when organized in a manner that makes it possible for the customer to use it. Customers may be offered a service as part of a larger package that would come with purchase of equipment or on a subscription basis. The data may be accessible via a website, emailed to the customer at an email address, accessed via a mobile device using a mobile application, or otherwise. In addition, the data may be collected and/or aggregated and sold to parts suppliers or fuel providers ("sellers"), thereby allowing the sellers to bid to supply the parts in bulk to the operators as the preventative maintenance parts wear out or fuel is consumed. Still yet, statistics may be sold or provided to industry standards groups or other groups that collect and provide such data to others within or outside the industry.

In addition to providing the abrasive blasting machine data to owners, operators, and customers, selected data may be provided to third parties, such as inspectors or inspection agencies, which would allow them to have the original data for log books. By providing the data in an automated manner, managers may be able to crosscheck with reports by their inspectors, thereby preventing fraud and mismanagement.

The data generated and collected may provide for (i) energy efficiency, (ii) productivity for both mechanical and labor, (iii) tracking of geographic location and orientation of the abrasive blasting machine so as to avoid theft and mistakes, (iv) tracking of temperature of machine components, (v) safety in terms of monitoring proper pressures, locations, operation, (vi) confirmation of operations to confirm reports by others, such as project inspectors, (vii) progress reports, (viii) analysis of past operations, (ix) projection of future operations, (x) accident reports, and (xi) reporting of liability issues.

Figure 17:
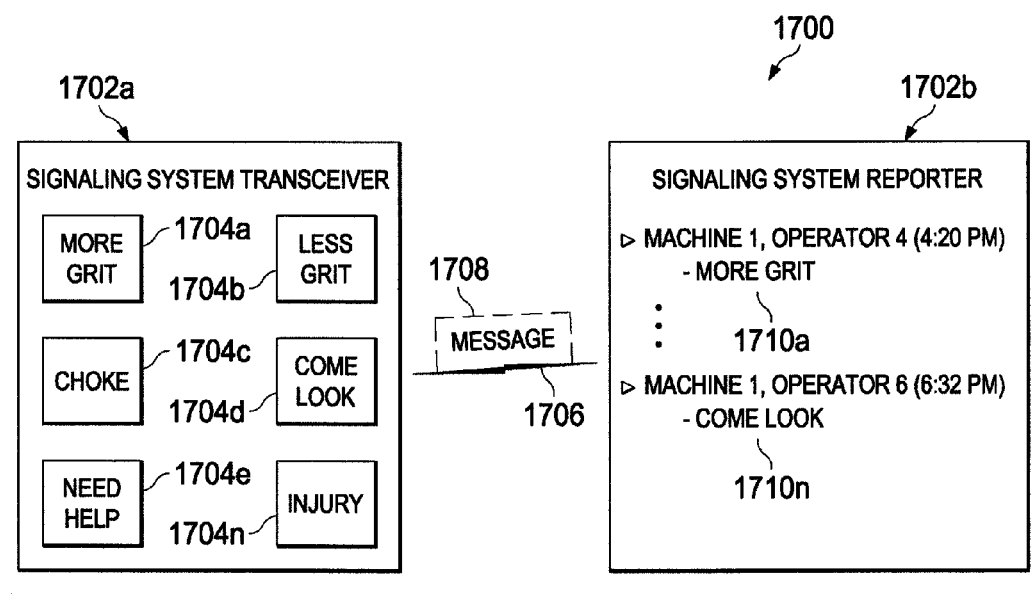
FIG. 17 is an illustration of an illustrative communications system for use on a jobsite that enables equipment operators and other workers (e.g., supervisors) to communicate with one another while far away or in noisy environments.

With regard to FIG. 17, illustration of an illustrative jobsite communications system 1700 for use on a jobsite that enables equipment operators and other workers (e.g., supervisors) to communicate with one another while far away or in noisy environments is shown. The communications system 1700 may include a signaling system transceiver 1702a and a signaling system reporter 1704b. The signaling system transceiver 1702a may include keys 1704a-1704n that may be preset to communicate specific messages to the signaling system reporter 1704b either directly or via a communications system (e.g., mobile telephone network). The use of large keypads allows operators who may be wearing thick gloves to operate the keypad without difficulty. Rather than using a keypad, alternative configurations may enable a user to select and send preset messages. The preset messages may be commonly used communications for the particular machine or task that is being performed on the jobsite. For example, operators of an abrasive blasting machine typically request "more grit," "less grit," "choke," "come look," "need help," and "injury." Other requests and commands may be provided. The signaling system transceiver 1702a may include fewer or more keys to provide the operator with fewer or more messages. The transceiver 1702a may be integrated into a nozzle and/or hose, either fixedly (e.g., screwed in) or removably (e.g., bracket), or be a separate device that may be carried or worn by the operator.

The signaling system reporter 1702b may be integrated into the controller of the abrasive blasting machine and use an electronic display of the controller or be a separate device from the controller. If the signaling system reporter 1702b is integrated into the controller, then the controller may automatically display a message in response to receiving one and hide the previous display or use a pop-up message, as understood in the art. The reporter 1702b may include the use of audible tones or other sounds, lights, and/or use vibration to alert a supervisor or other personnel that an operator has sent a message.

In response to an operator selecting a key (e.g., "more grit" key 1704a), the transceiver 1702a, which may include a wireless transmitter, may communicate via communications channel 1706 a message 1708 that is preset. The transceiver 1702a may be set up with machine information, operator number (e.g., associated with a particular blasting hose of a machine), and include a clock to communicate a time at which an operator sends a message. Alternatively, the reporter 1702b may timestamp a time that a message is received. The message 1708 may be communicated utilizing any communications protocol that is capable of communicating data, as understood in the art. In one embodiment, the transceiver 1702a may communicate a text message. Alternatively, the transceiver 1702a may communicate a code (e.g., 001100001; machine 1, operator 4, message 1 ("more grit")) that represents the message for the reporter to translate for display. If the message is successfully transmitted, the selected key may light up. Messages 1710a-1710n may be displayed on the reporter to allow a user to chronologically view each of the messages communicated by the operators. In another embodiment, the transceiver 1702a may operate to receive communications from the operator at the abrasive blasting machine and light up a corresponding light and optionally vibrate to notify the operator of the received message. Still yet, the transceiver 1702a may be configured to communicate with other transceivers being utilized by other operators. While described in association with an abrasive blasting machine, it should be understood that the use of the jobsite communications system may be configured for use with other machines or uses on jobsites where verbal and visual communications are otherwise difficult.

Figure 18:
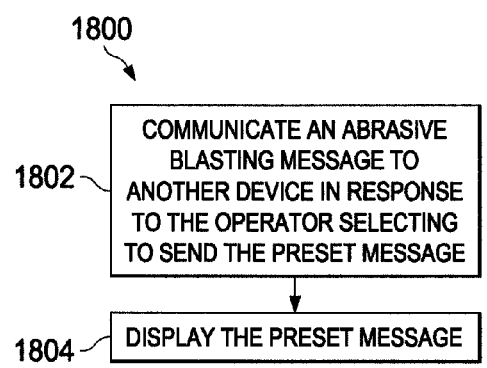
FIG. 18 is a flow chart of an illustrative process for providing communications between workers on a jobsite.

FIG. 18 is a flow chart of an illustrative process 1800 for providing communications between workers of an abrasive blasting machine on a jobsite. The process 1800 may include communicating a preset message related to abrasive blasting operations to a remote device in response to an operator selecting, to send a preset message at step 1802. The preset message may be a common command or request used for abrasive blasting. The preset message communicated by the operator may be displayed for another operator to view in step 1804.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for managing a fleet of abrasive blasting machines, said method comprising:
    collecting operational data produced by a plurality of abrasive blasting machines at a remote computing system from the abrasive blasting machines;
    storing the collected operational data in a data repository;
    calculating at least one parameter that is representative of a normalized operation of the abrasive blasting machines for comparison purposes;
    displaying at least a portion of the collected operational data for a user to view; and
    computing a performance rating for each of the abrasive blasting machines over a given time period, the performance rating factoring both operational data and non-operational data.

2. The method according to claim 1, wherein the operational data includes current status of the respective abrasive blasting machines.

3. The method according to claim 1, wherein calculating at least one parameter includes calculating the at least one parameter includes calculating blasting efficiency of an operator.

4. The method according to claim 1, further comprising determining non-operational data as a function of at least one of weather and temperature.

5. The method according to claim 1, wherein calculating the at least one parameter that is representative of a normalized operation includes calculating the at least one parameter by normalizing time over which the at least one parameter is measured.

* * * * *